US012649865B2

(12) United States Patent
Zong et al.

(10) Patent No.: US 12,649,865 B2
(45) Date of Patent: Jun. 9, 2026

(54) WATER-RESISTANT FILM LAYER AND ARTICLE THEREOF

(71) Applicant: JIANGSU FAVORED NANOTECHNOLOGY CO., LTD, Wuxi (CN)

(72) Inventors: Jian Zong, Wuxi (CN); Bixian Kang, Wuxi (CN)

(73) Assignee: JIANGSU FAVORED NANOTECHNOLOGY CO., LTD., Wuxi (CN)

( * ) Notice: Subject to any disclaimer, the term of this patent is extended or adjusted under 35 U.S.C. 154(b) by 488 days.

(21) Appl. No.: 17/998,924

(22) PCT Filed: Aug. 28, 2020

(86) PCT No.: PCT/CN2020/111975
§ 371 (c)(1),
(2) Date: Nov. 15, 2022

(87) PCT Pub. No.: WO2021/232608
PCT Pub. Date: Nov. 25, 2021

(65) Prior Publication Data

US 2023/0227689 A1 Jul. 20, 2023

(30) Foreign Application Priority Data

May 18, 2020 (CN) ......................... 202010419173.2
May 18, 2020 (CN) ......................... 202010419177.0

(51) Int. Cl.
*C09D 133/16* (2006.01)
*B05D 1/00* (2006.01)
*C08F 20/24* (2006.01)
*C09D 5/00* (2006.01)

(52) U.S. Cl.
CPC ............. *C09D 133/16* (2013.01); *B05D 1/62* (2013.01); *C08F 20/24* (2013.01); *C09D 5/00* (2013.01)

(58) Field of Classification Search
None
See application file for complete search history.

(56) References Cited

U.S. PATENT DOCUMENTS

| | | | | |
|---|---|---|---|---|
| 5,496,595 A * | 3/1996 | Ueda | ...................... | G11B 5/735 427/574 |
| 2010/0234524 A1 | 9/2010 | Coulson | | |
| 2012/0296032 A1 | 11/2012 | Legein et al. | | |
| 2014/0141221 A1 | 5/2014 | Storey et al. | | |
| 2018/0171171 A1 | 6/2018 | Coulson et al. | | |
| 2019/0335592 A1 | 10/2019 | Coulson et al. | | |

FOREIGN PATENT DOCUMENTS

| | | | |
|---|---|---|---|
| CN | 101370878 | 2/2009 | |
| CN | 103782366 | 5/2014 | |
| CN | 103946286 | 7/2014 | |
| CN | 104195828 | 12/2014 | |
| CN | 108029198 | 5/2018 | |
| CN | 109071966 | 12/2018 | |
| GB | 2493264 | 1/2013 | |
| WO | WO-2016198855 A1 * | 12/2016 | ............... B05D 1/62 |

OTHER PUBLICATIONS

International Search Report and Written Opinion for PCT/CN2020/111975 dated Jan. 29, 2021.

* cited by examiner

*Primary Examiner* — Ramsey Zacharia
(74) *Attorney, Agent, or Firm* — pH IP Law

(57) ABSTRACT

A water-resistant film layer, a preparation method therefor, and a product. The water-resistant film layer is formed on a surface of a substrate by one or more compounds shown in general formula (I) by means of a plasma chemical vapor deposition method, i.e., $R_1R_2{=}R_3R_4$ (I), wherein $R_1$ and $R_2$ are each independently selected from one of a group consisting of hydrogen, alkyl, halogen, haloalkyl, and aryl, at least one of $R_1$, $R_2$, and $R_3$ is halogen, and $R_4$ is a hydrophobic functional group, typically having a fluorine-containing alky structure.

(I)

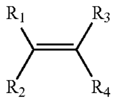

14 Claims, No Drawings

WATER-RESISTANT FILM LAYER AND ARTICLE THEREOF

CROSS-REFERENCE TO RELATED APPLICATIONS

This application is the national phase of International Application No. PCT/CN2020/111975, filed on Aug. 28, 2020, which claims the benefit of priority to Chinese Patent Application No. 202010419173.2 filed on May 18, 2020, and Chinese Patent Application No. 202010419177.0 filed on May 18, 2020, the entire disclosure of which are incorporated herein by reference.

TECHNICAL FIELD

The present disclosure relates to a surface modified film layer, in particular to a water-resistant film layer formed by plasma enhanced chemical vapor deposition, preparation method, application and article thereof.

BACKGROUND

It is a common technology to modify the surface of the substrate by forming a film layer on the surface of the substrate. For instance, the film layer is used to improve the electrical conductivity, anti-oil or water-resistant performance of the substrate surface.

Plasma chemical vapor deposition (PCVD) technology has been widely used to deposit polymer films on the surface of substrates, which is a technology that uses plasma to activate the reaction gas and promote the reaction gas to react on the substrate surface or near the surface space to generate solid film layer.

The low polarizability and strong electronegativity of fluorine atoms in fluorocarbon materials endow fluorocarbon polymers with many unique properties, such as high hydrophobicity and oleophobicity, and chemical resistance. Therefore, fluorocarbon materials are widely used in surface modification in architectural coating, textile industry, and military industry.

However, satisfied plasma polymerization of water-resistant fluorocarbons is not so easy to achieve. In the patent CN1190545, it disclosed one class of unsaturated fluorocarbons prepared by plasma chemical vapor deposition technology, and the number of perfluoroalkyl carbon atoms in this series of compounds can be ranging from 6 to 12. Combined with other studies, the hydrophobicity of fluorocarbons is closely related to the length of their perfluorocarbon chains. Currently the widely used water-resistant fluorocarbons are fluorocarbon materials in which the number of perfluoroalkyl carbon atoms in the compound is more than 8. One of the reasons is that when the number of perfluoroalkyl carbon atoms in the fluorocarbon is less than 8, such as 6, the water-resistant performance will be significantly reduced, that is difficult to meet the needs of practical applications. The patent CN102471405B also disclosed that when the number of the monomer perfluoroalkyl carbon atoms in the fluorocarbon polymer is less than 6, the hydrophobicity and oleophobicity are significantly reduced. It is considered that this is because the perfluoroalkyl group having carbon atoms less than 6 cannot form a crystal structure such as when the number of carbon atoms is 8 or more.

Based on the research on the unsaturated fluorocarbon disclosed in the patent CN1190545, it was found that when the number of carbon atoms in the fluorocarbon is 6, its water-resistant performance is obviously reduced, and the water-resistant performance is not stable.

On the other hand, the extensive use of long carbon-chain perfluoroalkyl groups often produces environmentally harmful and refractory organic compounds such as PFOA and PFOS. Since 2003, USEPA has proposed that exposure to PFOA and its salts can lead to adverse effects on the development of human health and other aspects. In Europe, under the influence of the United States, PFOA is banned to use according to the general safety standards under the EU Directive 2004/1935/EC (Resolution on Materials and Substances in Contact with Food). On Jun. 14, 2017, the European Union published in its Official Journal (EU) 2017/1000 a new restriction clause on perfluorooctanoic acid (PFOA) in the item 68 of Annex XVII of REACH Regulation, that officially includes PFOA and its salts and related substances in the list of restrictions under REACH. As early as December 2002, the 34th Joint Session of the Chemicals Committee held by OECD defined PFOS as a substance that persists in the environment, has biological savings and is harmful to humans. These regulations create technical challenges for obtaining good nanoscale protective coating.

Therefore, it is necessary to develop new fluorocarbon materials that can form a film layer on the surface of the substrate by plasma chemical vapor deposition technology, in particular to, that can maintain stable water-resistant performance when the number of perfluoroalkyl carbon atoms is not more than 8 carbon material.

SUMMARY

One advantage of the present disclosure is to provide a water-resistant film layer, a preparation method and an article thereof, wherein the water-resistant film layer is prepared by using a fluorocarbon material by plasma chemical vapor deposition technology and has good water-resistant performance.

Another advantage of the present disclosure is to provide a water-resistant film layer, a preparation method and an article thereof, wherein the water-resistant film layer can improve the hydrophobicity of the deposited film layer when the number of perfluoroalkyl carbon atoms of the fluorocarbon material is less than 8.

Another advantage of the present disclosure is to provide a water-resistant film layer, a preparation method and an article thereof, wherein when the number of perfluoroalkyl carbon atoms of the fluorocarbon material is 6 or less, the obtained water-resistant layer has stable water-resistant performance.

Another advantage of the present disclosure is to provide a water-resistant film layer, a preparation method and an article thereof, wherein when the number of perfluoroalkyl carbon atoms of the fluorocarbon material is 6 or less, the static contact angle of the obtained water-resistant film layer is greater than 110°.

Another advantage of the present disclosure is to provide a water-resistant film layer, a preparation method and an article thereof, wherein one of more fluorocarbon materials can be used as a reaction raw material gas and deposited on the surface of the substrate by plasma chemical vapor deposition technology to form a film layer.

Another advantage of the present disclosure is to provide a water-resistant film layer, a preparation method and an article thereof, wherein the water-resistant film layer can be deposited and formed on various types of substrates, for instance, circuit boards, mobile phones, TV sets and so on.

According to one aspect of the present disclosure, the present disclosure provides an article with a water-resistant film layer, wherein the article is set with the water-resistant film layer, and wherein the water-resistant film layer forms with a compound represented by the general formula (I) on the surface of a substrate by a plasma chemical vapor deposition method, (I)

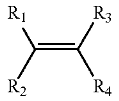

wherein $R_1$ and $R_2$ is respectively selected from one of hydrogen, alkyl, halogen, haloalkyl and aryl, wherein at least one of $R_1$, $R_2$, $R_3$ is halogen, and $R_4$ is selected from one of a group consisting of $—C(O)O(CH_2)_nC_mF_{2m+1}$, $—O—C(O)—(CH_2)_iC_mF_{2m+1}$, and $—(CH_2)_xC_mF_{2m+1}$, wherein n, i and x is respectively an integer ranging from 1 to 8, and m is an integer ranging from 1 to 12.

According to at least one embodiment of the present disclosure, the article is selected from one or more of a group consisting of electronic products, silk fabric, metal products, glass products and ceramic products.

According to at least one embodiment of the present disclosure, m is no more than 6.

According to another aspect of the present disclosure, the present disclosure provides a preparation method for a water-resistant film layer, wherein it comprises the following steps of feeding a compound represented by the general formula (I) as a reaction raw material into a reaction chamber of a plasma device, and performing plasma-enhanced chemical vapor deposition on the surface of a substrate in the plasma device to form a water-resistant film layer, (I)

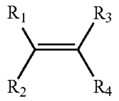

wherein $R_1$ and $R_2$ is respectively selected from one of hydrogen, alkyl, halogen, haloalkyl and aryl, wherein at least one of $R_1$, $R_2$, $R_3$ is halogen, and $R_4$ is selected from one of a group consisting of $—C(O)O(CH_2)_nC_mF_{2m+1}$, $—O—C(O)—(CH_2)_iC_mF_{2m+1}$, and $—(CH_2)_xC_mF_{2m+1}$, wherein n, i and x is respectively an integer ranging from 1 to 8, and m is an integer ranging from 1 to 12.

According to at least one embodiment of the present disclosure, it comprises the following steps to feed plasma source gas before feeding the reaction raw material to activate the chemical deposition reaction of the reaction raw material.

According to at least one embodiment of the present disclosure, the plasma source gas is selected from one or more of a group consisting of inert gas and fluorocarbon gas.

According to at least one embodiment of the present disclosure, the reaction raw material further comprises a cross-linking agent, and wherein the cross-linking agent is a multi-functional compound.

According to one aspect of the present disclosure, the present disclosure provides a water-resistant film layer, and the water-resistant film layer is formed with one or more compound represented by the general formula (I) on the surface of a substrate by a plasma chemical vapor deposition method, (I)

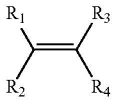

wherein $R_1$, $R_2$ and $R_3$ is respectively selected from one of hydrogen, alkyl, halogen, haloalkyl and aryl, wherein at least one of $R_1$, $R_2$ and $R_3$ is halogen, wherein $R_4$ is a group $X—R_5$, and $R_5$ is selected from one of alkyl, haloalkyl groups, and X is a bond; or X is a group $—C(O)O(CH_2)_nY—$, wherein n is an integer ranging from 0 to 10, and Y is a bond or a sulfamoyl group; or X is a group $—O—C(O)—(CH_2)_iZ—$, wherein i is an integer ranging from 1 to 10, and Z is a bond or a sulfamoyl group; or X is a group $—(CH_2)_xU—$, wherein x is an integer ranging from 1 to 10, and U is a bond or a sulfamoyl group; or X is a group $—(O)_pR_6(O)_q(CH_2)_t—$, wherein $R_6$ is an aryl group optionally substituted by a halogen, and p is 0 or 1, and q is 0 or 1, and t is 0 or an integer ranging from 1 to 10 when q is 1 and t is not 0.

According to one embodiment of the present disclosure, the general formula (I) is embodied as a compound of general formula (II), (II)

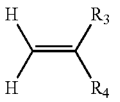

wherein $R_3$ is halogen, $R_4$ is selected from one of a group consisting of $—R_5$, $—C(O)O(CH_2)_nR_5$, and $—O—C(O)—(CH_2)_iR_5$, and $R_5$ is halogenated alkyl group.

According to one embodiment of the present disclosure, $R_5$ is a perhaloalkyl group.

According to one embodiment of the present disclosure, n is an integer ranging from 1 to 8.

According to one embodiment of the present disclosure, the general formula of $R_5$ is $C_mF_{2m+1}$.

According to one embodiment of the present disclosure, m is an integer ranging from 1 to 8.

According to another aspect of the present disclosure, the present disclosure provides an article with a water-resistant film layer, wherein the article is set with the water-resistant film layer, and wherein the water-resistant film layer forms with one or more compounds represented by the general formula (I) on the surface of a substrate by a plasma chemical vapor deposition method, (I)

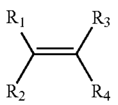

wherein $R_1$, $R_2$ and $R_3$ is respectively selected from one of hydrogen, alkyl, halogen, haloalkyl and aryl, wherein at least one of $R_1$, $R_2$ and $R_3$ is halogen, wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)_q(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

According to another aspect of the present disclosure, the present disclosure provides a preparation method for a water-resistant film layer, wherein it comprises the steps of feeding a compound represented by the general formula (I) as a reaction raw material into a reaction chamber of a plasma device, and performing plasma-enhanced chemical vapor deposition on the surface of a substrate in the plasma device to form a water-resistant film layer, (I)

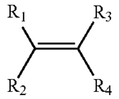

wherein $R_1$, $R_2$ and $R_3$ is respectively selected from one of hydrogen, alkyl, halogen, haloalkyl and aryl, wherein at least one of $R_1$, $R_2$ and $R_3$ is halogen, wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)_q(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

DETAILED DESCRIPTION

The following description is intended to expose the present disclosure to enable persons skilled in the field to implement the present disclosure. The preferred embodiments described below are only examples, and the persons skilled in the field can think of other obvious variations. The basic principles of the present disclosure defined in the following descriptions may be applied to other embodiments, variations, improvements, equivalents and other technical solutions that do not deviate from the spirit and scope of the present disclosure.

Persons skilled in the art would be able to understand that in the disclosure of the present disclosure, the terminology "halogen" refers to fluorine, chlorine, bromine and iodine. The terminology "hydrocarbon" refers alkyl, alkenyl or aryl groups. The terminology "aryl" refers to an aromatic cyclic group such as phenyl or naphthyl, especially phenyl. The terminology "alkyl" refers to a straight-chain or branched-chain of carbon atoms, suitably up to 20 carbon atoms in length. The terminology "alkenyl" refers to a straight-chain or branched-chain unsaturated of carbon atoms, suitably having 2 to 20 carbon atoms in length.

It would be understood that the terminology "one" should be understood as "at least one" or "one or more", that is, in one embodiment, the number of a component may be one, and in another embodiment, the number of the component may be more. The terminology "one" should not be understood as a limitation on the number.

The present disclosure provides a water-resistant film layer and a preparation method, an application and an article thereof. The water-resistant film layer comprises carbon, hydrogen and halogen. In some embodiments, the water-resistant film layer comprises carbon, hydrogen and fluorine. In some embodiments, the water-resistant film layer comprises carbon, hydrogen, fluorine and oxygen. The water-resistant film layer has good hydrophobic performance. In other words, when the water-resistant film layer is attached to the surface of a matrix, it can make the surface of the matrix have better water resistance to avoid damage by water or other liquids.

The present disclosure provides an article with a water-resistant film layer. In some embodiments of the present disclosure, the article can be selected from, but not limited to, electronic products, silk fabric, woven bags, metal surfaces, glass products and ceramic products.

When the article is an electronic device, the article can be but not limited to a portable device, such as a keyboard, which can become a water-resistant keyboard by plating the water-resistant coating. The article can be but not limited to a LED display, intelligent fingerprint lock, hearing aid, bluetooth headset, sensor suitable for working in liquid environment or often exposed to water, mobile phone, laptop, PSP and other electronic devices that may encounter water in the working environment.

Further, when water adheres to the water-resistant film layer, the static contact angle of water is greater than 110°. The static contact angle can be greater than 120°, or 110° to 115°, or 115° to 120°.

The water-resistant film layer is a nano-film layer, and its thickness can be made thinner so as to be suitable for precise electronic device. For instance, the thickness of the water-resistant film layer can range from 10 nm to 20 nm, such as 15 nm. The water-resistant film layer can also be made thicker according to users' needs. In some embodiments, the thickness of the water-resistant film layer can range from, but not limited to, 10 nm to 2000 nm.

The water-resistant film layer is formed on the surface of the substrate by plasma enhanced chemical vapor deposition (PECVD) process. In other words, during the preparation process, the surface of the substrate is exposed to a plasma enhanced chemical vapor deposition (CVD) reaction chamber in which plasma is formed and the water-resistant film layer is formed on the surface of the substrate by reaction material deposition reaction.

Plasmas suitable for use in the provided preparation methods of the present disclosure includes non-equilibrium plasmas, such as the plasmas generated by radio frequency (Rf), microwave or direct current (DC). They can operate at atmospheric pressure, or below atmospheric pressure. It is worth noting that the plasma source can be from a single compound, i.e., in the absence of other gases, or other gases, such as noble gases, or mixed with other gases. The unit for providing the plasma is referred to as a plasma source, a description of which can be found in the corresponding section below. A plasma consisting only of the monomeric compound can be obtained as follows. First of all, vacuumize the reaction apparatus as far as possible. Secondly, purge the reaction apparatus with the monomeric compound for a sufficient period of time, to discharge other gases in the reaction device.

Plasma enhanced chemical vapor deposition (PECVD) has many advantages compared with other existing deposition processes. Firstly, it is a dry process to produce uniform film is without pinholes. Secondly, plasma polymerization film solvent resistance, chemical corrosion resistance, heat resistance, wear resistance and other chemical and physical properties are stable. Thirdly, the plasma polymerized film has good adhesion to the substrate. Fourthly, the surface of the substrate with extremely irregularities can also be made into the uniform film. Fifthly, the coating preparation temperature is low and can be carried out at room temperature, which can effectively avoid damage to temperature-sensitive devices. Sixthly, the plasma process can not only prepare coating with a thickness of micrometers, but also can prepare ultra-thin nanoscale coating.

In the plasma enhanced chemical vapor deposition (PECVD) process adopted in the present disclosure, the plasma is generated by glow discharge, and the discharge method can be but not limited to microwave discharge, radio frequency discharge, ultraviolet discharge, electric spark discharge and so on.

Further, according to some embodiments of the present disclosure, during the formation process of the water-resistant film layer, the reaction raw material can be selected from monomer compounds having the general formula (I), wherein the general formula (I) is as follows, (I)

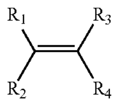

wherein $R_1$, $R_2$ and $R_3$ is respectively selected from one of hydrogen, alkyl, halogen, haloalkyl and aryl, wherein at least one of $R_1$, $R_2$ and $R_3$ is halogen, and wherein $R_4$ is selected from a group $—C(O)O(CH_2)_nC_mF_{2m+1}$ or a group $—O—C(O)—(CH_2)_iC_mF_{2m+1}$ or a group $—(CH_2)_xC_mF_{2m+1}$, wherein n, i and x is respectively an integer ranging from 1 to 8, and m is an integer ranging from 1 to 12. In some embodiments, the group $C_mF_{2m+1}$ can be a straight-chain fluoroalkyl group, or a branched-chain fluoroalkyl group, or a cyclic structure. In some embodiments, m is less than 8, for instance, no more than 6.

Further, when $—(CH_2)_n—$ in $R_4$ is used as a buffer segment between functional groups $—C(O)O—$, $—O—C(O)—$ and $C_mF_{2m+1}$, the chain length should be controlled within an appropriate range. If the chain length is too long, the fluorine content of the entire molecule will reduce, which is not conducive to improving the hydrophobic performance. In some embodiments, the value of n, i or x can be 1 or 2.

When $R_4$ of the monomer compound is a fluoroalkyl group, in some embodiments, the value of m can be an integer ranging from 1 to 7 in order to avoid the environment burden from PFOA and PFOS.

According to some embodiments of the present disclosure, the monomer compound of general formula (I) as a reaction raw material is embodied as a compound of general formula (III) as follows, (II)

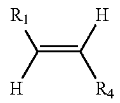

wherein $R_1$ is halogen, and wherein $R_4$ is selected from a group $—C(O)O(CH_2)_nC_mF_{2m+1}$, or a group $—O—C(O)—(CH_2)_iC_mF_{2m+1}$, or a group $(CH_2)_xC_mF_{2m+1}$, and wherein n, i or x is respectively an integer ranging from 1 to 8, and m is an integer of ranging from 1 to 12. In some embodiments, the group $C_mF_{2m+1}$ can be a straight-chain fluoroalkyl group, or a branched-chain fluoroalkyl group, or a cyclic structure. In some embodiments, m is less than 8, for instance, no more than 6.

According to some embodiments of the present disclosure, the monomer compound of general formula (I) as a reaction raw material is embodied as a compound of general formula (II) as follows, (II)

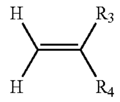

wherein $R_3$ is halogen, and wherein $R_4$ is selected from a group-$C(O)O(CH_2)_nC_mF_{2m+1}$, or a group $—O—C(O)—(CH_2)_iC_mF_{2m+1}$, or a group $(CH_2)_xC_mF_{2m+1}$, and wherein n, i or x is respectively an integer ranging from 1 to 8, and m is an integer of ranging from 1 to 12. In some embodiments, the group $C_mF_{2m+1}$ can be a straight-chain fluoroalkyl group, or a branched-chain fluoroalkyl group, or a cyclic structure. In some embodiments, m is less than 8, for instance, no more than 6.

Further, when $—(CH_2)_n—$ in $R_4$ is used as a buffer segment between functional groups $—C(O)O—$, $—O—C(O)—$ and $C_mF_{2m+1}$, the chain length should be controlled within an appropriate range. If the chain length is too long, the fluorine content of the entire molecule will reduce, which is not conducive to improving the hydrophobic performance. In some embodiments, the value of n, i or x can be 1 or 2.

When $R_4$ of the monomer compound is a fluoroalkyl group, in some embodiments, the value of m can be an integer ranging from 1 to 7 in order to avoid the environment burden from PFOA and PFOS.

According to some embodiments of the present disclosure, the monomer compound of general formula (I) as a reaction raw material is embodied as a compound of general formula (IV) as follows, (IV)

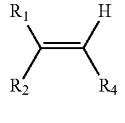

wherein $R_1$ and $R_2$ is respectively selected from one of hydrogen, alkyl, halogen, haloalkyl and aryl, wherein at least one of $R_1$, $R_2$ is halogen, and wherein $R_4$ is selected from a group $—C(O)O(CH_2)_nC_mF_{2m+1}$, or a group $—O—C(O)—(CH_2)_iC_mF_{2m+1}$, or a group $(CH_2)_xC_mF_{2m+1}$, and wherein n, i or x is respectively an integer ranging from 1 to 8, and m is an integer of ranging from 1 to 12. In some embodiments, the group $C_mF_{2m+1}$ can be a straight-chain fluoroalkyl group, or a branched-chain fluoroalkyl group, or a cyclic structure. In some embodiments, m is less than 8, for instance, no more than 6.

According to some embodiments of the present disclosure, the monomer compound of general formula (I) as a reaction raw material is embodied as a compound of general formula (V) as follows, (V)

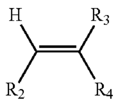

wherein $R_2$ and $R_3$ is respectively selected from one of hydrogen, alkyl, halogen, haloalkyl and aryl, wherein at least one of $R_2$, $R_3$ is halogen, and wherein $R_4$ is selected from a group —C(O)O($CH_2$) $C_mF_{2m+1}$, or a group —O—C(O)—$(CH_2)_iC_mF_{2m+1}$, or a group $(CH_2)_xC_mF_{2m+1}$, and wherein n, i or x is respectively an integer ranging from 1 to 8, and m is an integer of ranging from 1 to 12. In some embodiments, the group $C_mF_{2m+1}$ can be a straight-chain fluoroalkyl group, or a branched-chain fluoroalkyl group, or a cyclic structure. In some embodiments, m is less than 8, for instance, no more than 6.

Further, according to the embodiment of the present disclosure, in the formation process of the water-resistant film layer, the reaction materials can be selected from one or more of the aforesaid monomer compounds. In order to improve the cross-linking degree of the water-resistant film layer, a cross-linking agent can also be added, wherein the cross-linking agent is a compound with a multi-functional cross-linking structure. In the plasma glow discharge, the low-temperature plasma interrupts the active groups with higher energy in the cross-linking agent to form active points, and the introduced additional active points cross-link and polymerize with each other in the plasma environment to form a dense network structure.

According to the embodiment of the present disclosure, the cross-linking agent can be a multi-functional unsaturated hydrocarbon derivative, which can be selected from one or more of the groups consisting of ethoxylated trimethylolpropane triacrylate, tripropylene glycol diacrylate, divinylbenzene, polyethylene glycol diacrylate, 1,6-hexanediol diacrylate, ethylene glycol diacrylate, diethylene glycol divinyl ether, neopentyl glycol diacrylate.

Further, according to the embodiment of the present disclosure, the preparation method for water-resistant film layer is that the water-resistant film layer was formed on the surface of the substrate by PECVD process. The substrate is placed in a vacuum or low-pressure reaction chamber, and reaction materials are fed to generate plasma by glow discharge. The reaction materials are activated to produce chemical vapor deposition reaction on the surface of the substrate.

According to the embodiment of the present disclosure, the preparation method of the water-resistant film layer comprises the following steps:

1) Substrate Preparation

Before chemical vapor deposition is performed on the substrate, the substrate is cleaned to remove dust, moisture or grease from the surface of the substrate. The substrate can be cleaned with an organic solvent such as acetone or isopropanol, and then the substrate is placed into the reaction chamber of the reaction device.

2) Using PECVD Technology to Prepare the Water-Resistant Film Layer on the Surface of the Substrate The reaction chamber of the reaction device is continuously vacuumized, and then the vacuum degree in the reaction chamber is pumped to 10~200 mTorr, and the plasma source gas is fed into the reaction chamber.

Feed the reaction raw material until the degree of vacuum is 30~300 mTorr, turn on plasma discharge, carry out chemical vapor deposition, and prepare the water-resistant film layer on the surface of the substrate. The reaction raw material may be the monomer compound of the general formula (I) or a mixture of the monomer compound of the general formula (I) and the cross-linking agent.

When the reaction raw material is a mixture of the monomer compound of the general formula (I) and the cross-linking agent, the proportion of the cross-linking agent in the reaction raw material is 30~50%.

Then, the plasma discharge can be stopped, the feeding of the reaction raw material can be stopped, the vacuuming can be continued, and the vacuum degree of the reaction chamber can be kept at 10~200 mTorr for 1~5 mins, then the atmosphere can be introduced until normal pressure, and then the substrate can be taken out.

According to the embodiment of the present disclosure, the substrate in the preparation method is a solid material, such as an electronic component or an electrical component, and the water-resistant film layer formed on the surface of the substrate can be exposed to the international industrial water-resistant grade standard IPX1-IPX8 environment for use.

According to the embodiment of the present disclosure, the volume of the reaction chamber in the preparation method is 50~1000 L, and the temperature of the reaction chamber is controlled at 30~60° C. The flow rate of the inert gas or nitrogen is 5~300 sccm, and the inert gas is one of argon or helium, or a mixture of argon and helium.

According to the embodiment of the present disclosure, in the preparation method, the reaction raw material is fed into the reaction chamber through atomization and volatilization by a feeding pump, and is fed into the reaction chamber from a low pressure of 10~200 mTorr, and the flow rate of the fed reaction raw material is 10~1000 μL/min.

According to the embodiment of the present disclosure, the substrate is subjected to bombardment pretreatment before feeding the reaction raw material.

According to the embodiment of the present disclosure, in the preparation method, the power to turn on the plasma discharge is 2~500 W, and the continuous discharge time is 600~7200 seconds. The plasma discharge mode can be radio frequency discharge, microwave discharge, intermediate frequency discharge or electric spark discharge.

According to the embodiment of the present disclosure, in the preparation method, the energy output mode of the plasma radio frequency during the plasma radio frequency discharge process is controlled to be pulsed or continuous output. When the energy output mode of the plasma radio frequency is pulsed output, the pulse width is 2 μs~1 ms, and the repetition frequency is 20 Hz~10 kHz.

According to the embodiment of the present disclosure, in the preparation method, the plasma source may be a fluorocarbon gas. The plasma source forming the water-resistant film layer has a structural formula: $C_xF_{2x+2}$ or $C_xF_{2x}$, and wherein x is 1, 2, or 3. In other words, the number of carbon atoms of the plasma source used is at most 3 and lower than 4. In this way, one of the raw materials of the water-resistant nanofilm has a lower number of carbon atoms, thereby reducing the formation of organic substance that is harmful to the environment and difficult to degrade. In some embodiments, the plasma source gas is selected from one of carbon tetrafluoride, tetrafluoroethylene, and hexafluoroethane.

According to some embodiments of the present disclosure, during the formation process of the water-resistant film layer, the reaction raw material can be selected from monomer compounds having the general formula (I), wherein the general formula (I) is as follows, (I)

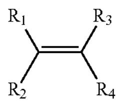

wherein $R_1$, $R_2$ and $R_3$ is respectively selected from one of hydrogen, alkyl, halogen, haloalkyl and aryl, wherein at least one of $R_1$, $R_2$ and $R_3$ is halogen, and wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)_q(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

Further, when $R_5$ is a haloalkyl group, $R_5$ can be a perhaloalkyl group. According to some embodiments of the present disclosure, $R_5$ is $C_mF_{2m+1}$, and the range of m can be an integer from ranging from 1 to 13. In some embodiments, $R_5$ can be a straight-chain alkyl group or a branched-chain alkyl group. In some embodiments, m is less than 8, for instance, no more than 6.

Further, when X is a functional group and —$(CH_2)_n$— in X is used as a buffer segment between functional groups —C(O)O—, —O—C(O)— and Z or U, the chain length should be controlled within an appropriate range. If the chain length is too long, the fluorine content of the entire molecule will reduce, which is not conducive to improving the hydrophobic performance. In some embodiments, the value of n, i or x can be 1 or 2.

When $R_5$ of the monomer compound is a fluoroalkyl group, in some embodiments, the value of m can be an integer ranging from 1 to 7 in order to avoid the environment burden from PFOA and PFOS.

According to some embodiments of the present disclosure, the monomer compound of general formula (I) as a reaction raw material is embodied as a compound of general formula (II) as follows, (II)

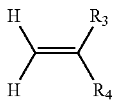

wherein $R_3$ is halogen, and wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)_q(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

Further, when $R_5$ is a haloalkyl group, $R_5$ can be embodied as a perhaloalkyl group. According to some embodiments of the present disclosure, $R_5$ is $C_mF_{2m+1}$, and the range of m can be an integer from ranging from 1 to 13. In some embodiments, m is no more than 6.

Further, when X is a functional group and —$(CH_2)_n$— in X is used as a buffer segment between functional groups —C(O)O—, —O—C(O)— and Z or U, the chain length should be controlled within an appropriate range. If the chain length is too long, the fluorine content of the entire molecule will reduce, which is not conducive to improving the hydrophobic performance. In some embodiments, the value of n, i or x can be 1 or 2.

When $R_5$ of the monomer compound is a fluoroalkyl group, in some embodiments, the value of m can be an integer ranging from 1 to 7 in order to avoid the environment burden from PFOA and PFOS.

According to some embodiments of the present disclosure, the monomer compound of general formula (I) as a reaction raw material is embodied as a compound of general formula (III) as follows, (III)

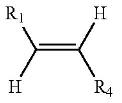

wherein $R_1$ selected from one of hydrogen, alkyl, halogen, haloalkyl and aryl, wherein at least one of $R_1$ and $R_4$ is halogen, such as chlorin, and wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)_q(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

Further, when $R_5$ is a haloalkyl group, $R_5$ can be embodied as a perhaloalkyl group. According to some embodiments of the present disclosure, $R_5$ is $C_mF_{2m+1}$, and the range of m can be an integer from ranging from 1 to 13. In some embodiments, m is no more than 6.

According to some embodiments of the present disclosure, the monomer compound of general formula (I) as a reaction raw material is embodied as a compound of general formula (IV) as follows, (IV)

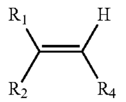

wherein $R_1$ and $R_2$ is respectively selected from one of hydrogen, alkyl, halogen, haloalkyl and aryl, wherein $R_1$ and/or $R_2$ is halogen, and wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)_q$ $(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

Further, when $R_5$ is a haloalkyl group, $R_5$ can be embodied as a perhaloalkyl group. According to some embodiments of the present disclosure, $R_5$ is $C_mF_{2m+1}$, and the range of m can be an integer from ranging from 1 to 13. In some embodiments, m is no more than 6.

According to some embodiments of the present disclosure, the monomer compound of general formula (I) as a reaction raw material is embodied as a compound of general formula (V) as follows, (V)

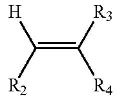

wherein $R_2$ and $R_3$ is respectively selected from one of hydrogen, alkyl, halogen, haloalkyl and aryl, wherein at least one of $R_2$, $R_3$ is halogen, or both $R_2$ and $R_3$ are halogen such as chlorin, and wherein $R_4$ is a group X—$R_5$, and $R_5$ is selected from one of alkyl, haloalkyl groups, and X is a bond; or X is a group —C(O)O$(CH_2)_n$Y—, wherein n is an integer ranging from 0 to 10, and Y is a bond or a sulfamoyl group; or X is a group —O—C(O)—$(CH_2)_i$Z—, wherein i is an integer ranging from 1 to 10, and Z is a bond or a sulfamoyl group; or X is a group —$(CH_2)_x$U—, wherein x is an integer ranging from 1 to 10, and U is a bond or a sulfamoyl group; or X is a group —$(O)_pR_6(O)$, $(CH_2)_t$—, wherein $R_6$ is an aryl group optionally substituted by a halogen, and p is 0 or 1, and q is 0 or 1, and t is 0 or an integer ranging from 1 to 10 when q is 1 and t is not 0.

Further, when $R_5$ is a haloalkyl group, $R_5$ can be embodied as a perhaloalkyl group. According to some embodiments of the present disclosure, $R_5$ is $C_mF_{2m+1}$, and the range of m can be an integer from ranging from 1 to 13. In some embodiments, m is no more than 6.

Further, according to the embodiment of the present disclosure, in the formation process of the water-resistant film layer, the reaction materials can be selected from one or more of the aforesaid monomer compounds, in order to improve the cross-linking degree of the water-resistant film layer. A cross-linking agent can also be added, wherein the cross-linking agent is a compound with a multi-functional cross-linking structure. In the plasma glow discharge, the low-temperature plasma interrupts the active groups with higher energy in the cross-linking agent to form active points, and the introduced additional active points cross-link and polymerize with each other in the plasma environment to form a dense network structure.

According to the embodiment of the present disclosure, the cross-linking agent can be a multi-functional unsaturated hydrocarbon derivative, which can be selected from one or more of the groups consisting of ethoxylated trimethylolpropane triacrylate, tripropylene glycol diacrylate, divinylbenzene, polyethylene glycol diacrylate, 1,6-hexanediol diacrylate, ethylene glycol diacrylate, diethylene glycol divinyl ether, neopentyl glycol diacrylate.

Further, according to the embodiment of the present disclosure, the preparation method for water-resistant film layer is that the water-resistant film layer was formed on the surface of the substrate by PECVD process. The substrate is placed in a vacuum or low-pressure reaction chamber, and reaction materials are fed to generate plasma by glow discharge. The reaction materials are activated to produce chemical vapor deposition reaction on the surface of the substrate.

According to the embodiment of the present disclosure, the preparation method of the water-resistant film layer comprises the following steps:

1) Substrate Preparation

Before chemical vapor deposition is performed on the substrate, the substrate is cleaned to remove dust, moisture or grease from the surface of the substrate. The substrate can be cleaned with an organic solvent such as acetone or isopropanol, and then the substrate is placed into the reaction chamber of the reaction device.

2) Using PECVD Technology to Prepare the Water-Resistant Film Layer on the Surface of the Substrate The reaction chamber of the reaction device is continuously vacuumized, and then the vacuum degree in the reaction chamber is pumped to 10~200 mTorr, and the plasma source gas is fed into the reaction chamber.

Feed the reaction raw material until the degree of vacuum is 30~300 mTorr, turn on plasma discharge, carry out chemical vapor deposition, and prepare the water-resistant film layer on the surface of the substrate. The reaction raw material may be the monomer compound of the general formula (I) or a mixture of the monomer compound of the general formula (I) and the cross-linking agent.

When the reaction raw material is a mixture of the monomer compound of the general formula (I) and the cross-linking agent, the proportion of the cross-linking agent in the reaction raw material is 30~50%.

Then, the plasma discharge can be stopped, the feeding of the reaction raw material can be stopped, the vacuuming can be continued, and the vacuum degree of the reaction chamber can be kept at 10~200 mTorr for 1~5 minutes, then the atmosphere can be introduced until normal pressure, and then the substrate can be taken out.

According to the embodiment of the present disclosure, the substrate in the preparation method is a solid material, such as an electronic component or an electrical component, and the water-resistant film layer formed on the surface of the substrate can be exposed to the international industrial water-resistant grade standard IPX1-IPX8 environment for use.

According to the embodiment of the present disclosure, the volume of the reaction chamber in the preparation method is 50~1000 L, and the temperature of the reaction chamber is controlled at 30~60° C. The flow rate of the inert gas or nitrogen is 5~300 sccm, and the inert gas is one of argon or helium, or a mixture of argon and helium.

According to the embodiment of the present disclosure, in the preparation method, the reaction raw material is fed into the reaction chamber through atomization and volatilization by a feeding pump, and is fed into the reaction chamber from a low pressure of 10~200 mTorr, and the flow rate of the fed reaction raw material is 10~1000 μL/min.

According to the embodiment of the present disclosure, the substrate is subjected to bombardment pretreatment before feeding the reaction raw material.

According to the embodiment of the present disclosure, in the preparation method, the power to turn on the plasma discharge is 2~500 W, and the continuous discharge time is 600~7200 seconds. The plasma discharge mode can be radio frequency discharge, microwave discharge, intermediate frequency discharge or electric spark discharge.

According to the embodiment of the present disclosure, in the preparation method, the energy output mode of the plasma radio frequency during the plasma radio frequency discharge process is controlled to be pulsed or continuous output. When the energy output mode of the plasma radio frequency is pulsed output, the pulse width is 2 μs~1 ms, and the repetition frequency is 20 Hz~10 kHz.

According to the embodiment of the present disclosure, in the preparation method, the plasma source may be a fluorocarbon gas. The plasma source forming the water-resistant film layer has a structural formula: $C_xF_{2x+2}$ or $C_xF_{2x}$, and wherein x is 1, 2, or 3. In other words, the number of carbon atoms of the plasma source used is at most 3 and lower than 4. In this way, one of the raw materials of the water-resistant nanofilm has a lower number of carbon atoms, thereby reducing the formation of organic substance that is harmful to the environment and difficult to degrade. In some embodiments, the plasma source gas is selected from one of carbon tetrafluoride, tetrafluoroethylene, and hexafluoroethane.

Embodiment 1

A preparation method for water-resistant and electric-breakdown-resistant coating, comprises the following steps:

(1) The substrate is placed in the reaction chamber of the reaction device, and the reaction chamber is continuously vacuumized. The vacuum degree in the reaction chamber is vacuumized to 10 mTorr, and the inert gas of the plasma source is fed:

(2) Feed the reaction raw material to a vacuum degree of 30 mTorr, turn on plasma discharge to carry out chemical vapor deposition and to form water-resistant film layer on the surface of the substrate; and (3) Stop plasma discharge, stop feeding the reaction raw material, continue to vacuumize to keep the reaction chamber vacuum degree of 10 mTorr, feed atmospheric pressure after 1 min to normal pressure, such as one atmosphere, and then take out substrate.

In step (1), the substrate is a solid material, and the solid material is an electronic component-circuit board, and any interface of the water-resistant film layer formed on the surface of the substrate can be exposed to the international industrial water-resistant grade standard IPX1 environment for use.

In step (1), the volume of the reaction chamber of the reaction device is 50 L, the temperature of the reaction chamber is controlled at 30° C., the flow rate of the inert gas is 5 sccm, and the inert gas is argon.

In step (2), the reaction raw material is atomized and volatilized by a feeding pump, and is fed into the reaction chamber from a low pressure of 10 mTorr, and the flow rate of the fed reaction raw material is 10 μL/min. The reaction raw material composition is:

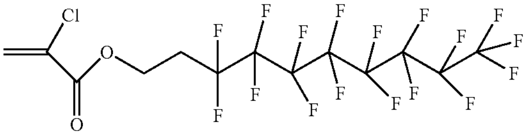 [SMILES: C=C(Cl)C(=O)OCCC(F)(F)C(F)(F)C(F)(F)C(F)(F)C(F)(F)C(F)(F)C(F)(F)C(F)(F)F]

In step (2), glow discharge is performed to pre-treat the substrate by bombardment before feeding the fluorocarbon monomer vapor.

In step (2), the power to turn on the plasma discharge is 2 W, and the continuous discharge time is 7200 seconds. The plasma discharge mode is radio frequency discharge, and the energy output mode of the plasma radio frequency during the plasma radio frequency discharge process is controlled to be pulsed output. When the energy output mode of plasma radio frequency is pulse output, the pulse width is 2 μs, and the repetition frequency is 20 Hz.

Embodiment 2

The basic process steps of this embodiment are the same as that of embodiment 1, and the different process parameters are as follows:

In step (1), the vacuum degree in the reaction chamber is vacuumized to 40 mTorr, and an inert gas is fed.

In step (1), the substrate is a solid material, and the solid material is an electrical component-TV casting, and any interface of the water-resistant film layer formed on the surface of the substrate can be exposed to the international industrial water-resistant grade standard IPX3 environment for use.

In step (1), the volume of the reaction chamber of the reaction device is 260 L, the temperature of the reaction chamber is controlled at 40° C., the flow rate of the inert gas is 60 sccm, and the inert gas is helium.

In step (2), the reaction raw material is fed to a vacuum degree of 80 mTorr, and the plasma discharge is generated.

In step (2), feed reaction raw material vapor is fed through atomization and volatilization by a feeding pump, and is fed into the reaction chamber from a low pressure of 40 mTorr, and the flow rate of the fed reaction raw material is 90 μL/min.

The reaction raw material composition is:

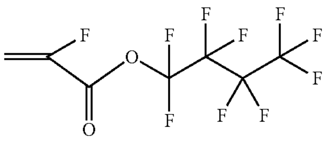 [SMILES: C=C(F)C(=O)OC(F)(F)C(F)(F)C(F)(F)C(F)(F)F]

In step (2), the power to turn on the plasma discharge is 25 W, and the continuous discharge time is 5800 seconds. The plasma discharge mode is radio frequency discharge, and the energy output mode of the plasma radio frequency during the plasma radio frequency discharge process is controlled to be pulsed output. When the energy output mode of plasma radio frequency is pulse output, the pulse width is 0.1 ms, and the repetition frequency is 400 Hz.

Embodiment 3

The basic process steps of this embodiment are the same as that of embodiment 1, and the different process parameters are as follows:

In step (1), the vacuum degree in the reaction chamber is vacuumized to 100 mTorr, and a fluorocarbon gas is fed as the plasma source gas.

In step (1), the substrate is a solid material, and the solid material is an electronic component-mobile phone, and any interface of the water-resistant film layer formed on the surface of the substrate can be exposed to the international industrial water-resistant grade standard IPX4 environment for use.

In step (1), the volume of the reaction chamber of the reaction device is 380 L, the temperature of the reaction chamber is controlled at 45° C., the flow rate of the fluorocarbon gas is 130 sccm, and the fluorocarbon gas is tetrafluoroethane.

In step (2), the reaction raw material is fed to a vacuum degree of 130 mTorr, and the plasma discharge is generated.

In step (2), feed reaction raw material vapor is fed through atomization and volatilization by a feeding pump, and is fed into the reaction chamber from a low pressure of 100 mTorr, and the flow rate of the fed reaction raw material is 180 μL/min.

The reaction raw material composition is:

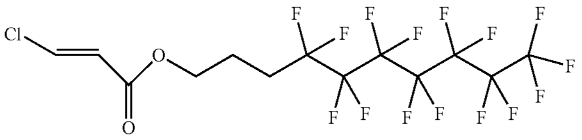 [SMILES: O=C(/C=C/Cl)OCCCC(F)(F)C(F)(F)C(F)(F)C(F)(F)C(F)(F)C(F)(F)C(F)(F)F]

In step (2), the power to turn on the plasma discharge is 100 W, and the continuous discharge time is 4500 seconds. The plasma discharge mode is radio frequency discharge, and the energy output mode of the plasma radio frequency during the plasma radio frequency discharge process is controlled to be pulsed output. When the energy output mode of plasma radio frequency is pulse output, the pulse width is 1 ms, and the repetition frequency is 10 kHz.

In step (3), keep the reaction chamber vacuum degree of 130 mTorr, feed atmospheric pressure after 3 mins to one atmosphere.

Embodiment 4

The basic process steps of this embodiment are the same as that of embodiment 1, and the different process parameters are as follows:

In step (1), the vacuum degree in the reaction chamber is vacuumized to 150 mTorr, and a nitrogen gas is fed, wherein the substrate is a solid material, and the solid material is an electrical component, and any interface of the water-resistant film layer formed on the surface of the substrate can be exposed to the international industrial water-resistant grade standard IPX6 environment for use.

In step (1), the volume of the reaction chamber of the reaction device is 560 L, the temperature of the reaction chamber is controlled at 50° C., the flow rate of the nitrogen gas is 220 sccm.

In step (2), the reaction raw material is fed to a vacuum degree of 220 mTorr, and the plasma discharge is generated.

Feed reaction raw material vapor is fed through atomization and volatilization by a feeding pump, and is fed into the reaction chamber from a low pressure of 150 mTorr, and the flow rate of the fed reaction raw material is 120 μL/min.

The reaction raw material composition is:

The unsaturated fluorocarbon in the reaction raw material is:

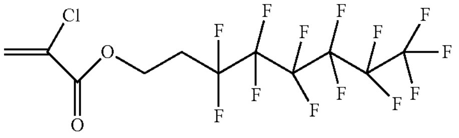 [SMILES: C=C(Cl)C(=O)OCCC(F)(F)C(F)(F)C(F)(F)C(F)(F)C(F)(F)C(F)(F)F]

In step (2), the power to turn on the plasma discharge is 240 W, and the plasma discharge mode is plasma pulse discharge.

In step (3), keep the reaction chamber vacuum degree of 160 mTorr, feed atmospheric pressure after 4 mins to one atmosphere.

It should be understood that the plasma discharge mode can be adjusted as required.

Embodiment 5

The basic process steps of this embodiment are the same as that of embodiment 1, and the different process parameters are as follows:

In step (1), the vacuum degree in the reaction chamber is vacuumized to 150 mTorr, and a nitrogen gas is fed, wherein the substrate is a solid material, and the solid material is an electrical component, and any interface of the water-resistant film layer formed on the surface of the substrate can be exposed to the international industrial water-resistant grade standard IPX6 environment for use.

In step (1), the volume of the reaction chamber of the reaction device is 560 L, the temperature of the reaction chamber is controlled at 50° C., the flow rate of the nitrogen gas is 220 sccm.

In step (2), the reaction raw material is fed to a vacuum degree of 220 mTorr, and the plasma discharge is generated.

In step (2), feed reaction raw material vapor is fed through atomization and volatilization by a feeding pump, and is fed into the reaction chamber from a low pressure of 150 mTorr, and the flow rate of the fed reaction raw material is 320 μL/min.

The reaction raw material composition is:

The unsaturated fluorocarbon in the reaction raw material is:

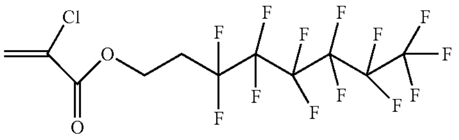 [SMILES: C=C(Cl)C(=O)OCCC(F)(F)C(F)(F)C(F)(F)C(F)(F)C(F)(F)C(F)(F)F]

The multi-functional unsaturated hydrocarbon derivative used as a cross-linking agent in the reaction raw material is: ethylene glycol diacrylate, wherein the mass fraction ratio of the unsaturated fluorocarbon compound and the unsaturated hydrocarbon derivative is 55%: 45%.

In step (2), the power to turn on the plasma discharge is 240 W, and the continuous discharge time is 3200 seconds. The plasma discharge mode is microwave discharge.

In step (3), keep the reaction chamber vacuum degree of 160 mTorr, feed atmospheric pressure after 4 mins to one atmosphere.

Comparable Embodiment 4 is prepared on the same other substrate under the same conditions as in Embodiment 4. The different is that the unsaturated fluorocarbons of the reaction raw material in Comparable Embodiment 4 is:

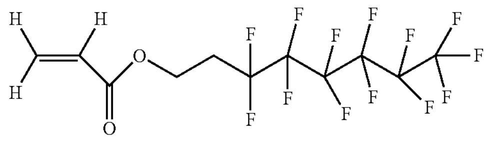 [SMILES: C=CC(=O)OCCC(F)(F)C(F)(F)C(F)(F)C(F)(F)C(F)(F)C(F)(F)F]

For aforesaid embodiments, respectively carry out the hydrophobic performance test. The test results are shown in the following table, and the test method is as follows:

The thickness of the film layer is detected by the American Filmetrics F20-UV-film thickness measuring instrument.

The water contact angle of the film layer is tested according to the GB/T 30447-2013 standard.

| Embodiment | Thickness/nm | Contact angel/° |
|---|---|---|
| Embodiment1 | 15 | 123 |
| Embodiment2 | 10 | 120 |
| Embodiment3 | 14 | 119 |
| Embodiment4 | 10 | 115 |
| Embodiment5 | 10 | 112 |
| Comparable Embodiment 4 | 10 | 110 |

Further, for the water-resistant film layer obtained in Embodiment 4, the test results are shown as follows:

| Coating time | Nanocoating thickness | Water drop angle | Leave for 30 minutes |
|---|---|---|---|
| 20 min | 10 nm | 115° | 115 ± 1° |
| 40 min | 20 nm | 120° | 120 ± 1° |

For the water-resistant film layer obtained in Comparable Embodiment 4, the test results are shown as follows:

| Coating time | Nanocoating thickness | Water drop angle | Leave for 10 minutes |
|---|---|---|---|
| 20 min | 10 nm | 110° | <100° |
| 40 min | 20 nm | 112° | <100° |

By comparing the above two tables, it can be seen that the water-resistant performance of the water-resistant film layer in Embodiment 4 is relatively stable, and it is worth noting that the carbon atom of the perfluoroalkyl group of the unsaturated fluorocarbon compound in Embodiment 4 is 6. In other words, the water-resistant film layer disclosed in the present disclosure can provide excellent water-resistant performance while reducing environmental pollution when the carbon number of the perfluoroalkyl group of the raw material is less than 8.

Further, the present disclosure provides more embodiments and comparable embodiments as follows:

The present disclosure provides Embodiment 6 and Comparable Embodiment 6 as follows:

Embodiment 6

The basic process steps of this embodiment are the same as that of embodiment 1, and the different process parameters are as follows:

In step (1), the vacuum degree in the reaction chamber is vacuumized to 160 mTorr, and an argon gas is fed.

The substrate is a solid material, and the solid material is an electrical component, and any interface of the water-resistant film layer formed on the surface of the substrate can be exposed to the international industrial water-resistant grade standard IPX5 environment for use.

The volume of the reaction device is 550 L, the temperature of the reaction chamber is controlled at 45° C., the flow rate of the argon gas is 200 sccm.

In step (2), the reaction raw material is fed to a vacuum degree of 200 mTorr, and the plasma discharge is generated.

Feed reaction raw material vapor is fed through atomization and volatilization by a feeding pump, and is fed into the reaction chamber from a low pressure of 150 mTorr, and the flow rate of the fed reaction raw material is 150 μL/min.

The reaction raw material composition is:

The unsaturated fluorocarbon in the reaction raw material is:

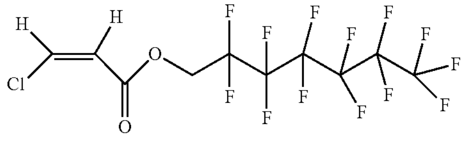 [SMILES: O=C(/C=C\Cl)OCC(F)(F)C(F)(F)C(F)(F)C(F)(F)C(F)(F)C(F)(F)F]

In step (2), the power to turn on the plasma discharge is 200 W, and the plasma discharge mode is plasma discharge.

In step (3), keep the reaction chamber vacuum degree of 160 mTorr, feed atmospheric pressure after 4 mins to one atmosphere.

It should be understood that the plasma discharge mode can be adjusted as required.

Comparable Embodiment 6 is prepared on the same other substrate under the same conditions as in Embodiment 6. The different is that the unsaturated fluorocarbons of the reaction raw material in Comparable Embodiment 6 is:

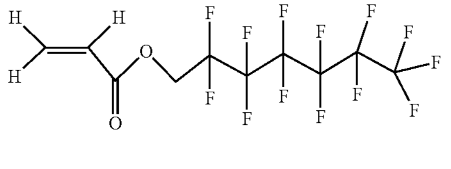 [SMILES: C=CC(=O)OCC(F)(F)C(F)(F)C(F)(F)C(F)(F)C(F)(F)C(F)(F)F]

For aforesaid embodiments, respectively carry out the hydrophobic performance test. The test method is as follows:

The thickness of the film layer is detected by the American Filmetrics F20-UV-film thickness measuring instrument.

The water contact angle of the film layer is tested according to the GB/T 30447-2013 standard.

For the water-resistant film layer obtained in Embodiment 6, the test results are shown as follows:

| Coating time | Nanocoating thickness | Water drop angle | Leave for 30 minutes |
|---|---|---|---|
| 15 min | 10 nm | 116° | 116 ± 1° |
| 30 min | 20 nm | 118° | 118 ± 1° |

For the water-resistant film layer obtained in Comparable Embodiment 6, the test results are shown as follows:

| Coating time | Nanocoating thickness | Water drop angle | Leave for 10 minutes |
|---|---|---|---|
| 15 min | 10 nm | 105° | <100° |
| 30 min | 20 nm | 110° | <100° |

By comparing the above two tables, it can be seen that the water-resistant performance of the water-resistant film layer in Embodiment 6 is relatively stable, and it is worth noting that the carbon atom of the perfluoroalkyl group of the unsaturated fluorocarbon compound in Embodiment 6 is 6. In other words, the water-resistant film layer disclosed in the present disclosure can provide excellent water-resistant performance while reducing environmental pollution when the carbon number of the perfluoroalkyl group of the raw material is less than 8.

Further, the present disclosure provides Embodiment 7 and Comparable Embodiment 7 as follows:

Embodiment 7

The basic process steps of this embodiment are the same as that of embodiment 1, and the different process parameters are as follows:

In step (1), the vacuum degree in the reaction chamber is vacuumized to 150 mTorr, and a helium gas is fed.

The substrate is a solid material, and the solid material is an electrical component, and any interface of the water-resistant film layer formed on the surface of the substrate can be exposed to the international industrial water-resistant grade standard IPX4 environment for use.

The volume of the reaction device is 550 L, the temperature of the reaction chamber is controlled at 40° C., the flow rate of the helium gas is 200 sccm.

In step (2), the reaction raw material is fed to a vacuum degree of 200 mTorr, and the plasma discharge is generated.

Feed reaction raw material vapor is fed through atomization and volatilization by a feeding pump, and is fed into the reaction chamber from a low pressure of 120 mTorr, and the flow rate of the fed reaction raw material is 200 μL/min.

The reaction raw material composition is:

The unsaturated fluorocarbon in the reaction raw material is:

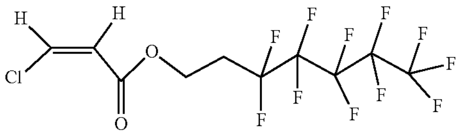 [SMILES: O=C(/C=C\Cl)OCCC(F)(F)C(F)(F)C(F)(F)C(F)(F)C(F)(F)F]

In step (2), the power to turn on the plasma discharge is 250 W, and the plasma discharge mode is plasma pulse discharge.

In step (3), keep the reaction chamber vacuum degree of 150 mTorr, feed atmospheric pressure after 4 mins to one atmosphere.

It should be understood that the plasma discharge mode can be adjusted as required.

Comparable Embodiment 7 is prepared on the same other substrate under the same conditions as in Embodiment 7. The different is that the unsaturated fluorocarbons of the reaction raw material in Comparable Embodiment 7 is:

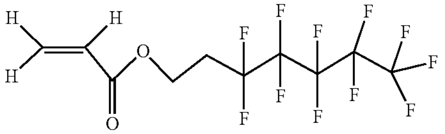 [SMILES: C=CC(=O)OCCC(F)(F)C(F)(F)C(F)(F)C(F)(F)C(F)(F)F]

For aforesaid embodiments, respectively carry out the hydrophobic performance test. The test method is as follows:

The thickness of the film layer is detected by the American Filmetrics F20-UV-film thickness measuring instrument.

The water contact angle of the film layer is tested according to the GB/T 30447-2013 standard.

For the water-resistant film layer obtained in Embodiment 7, the test results are shown as follows:

| Coating time | Nanocoating thickness | Water drop angle | Leave for 30 minutes |
|---|---|---|---|
| 10 min | 10 nm | 116° | 116 ± 1° |
| 20 min | 20 nm | 120° | 120 ± 1° |

For the water-resistant film layer obtained in Comparable Embodiment 7, the test results are shown as follows, and after leaving for 10 minutes, the water drop angle will be less than 100°.

| Coating time | Nanocoating thickness | Water drop angle | Leave for 10 minutes |
|---|---|---|---|
| 10 min | 10 nm | 105° | <100° |
| 20 min | 20 nm | 108° | <100° |

By comparing the above two tables, it can be seen that the water-resistant performance of the water-resistant film layer in Embodiment 7 is relatively stable, and it is worth noting that the carbon atom of the perfluoroalkyl group of the unsaturated fluorocarbon compound in Embodiment 7 is 5. In other words, the water-resistant film layer disclosed in the present disclosure can provide excellent water-resistant performance while reducing environmental pollution when the carbon number of the perfluoroalkyl group of the raw material is less than 8.

Further, the present disclosure provides Embodiment 8 and Comparable Embodiment 8 as follows:

Embodiment 8

The basic process steps of this embodiment are the same as that of embodiment 1, and the different process parameters are as follows:

In step (1), the vacuum degree in the reaction chamber is vacuumized to 120 mTorr, and a mixture gas of argon and helium is fed.

The substrate is a solid material, and the solid material is an electrical component, and any interface of the water-resistant film layer formed on the surface of the substrate can be exposed to the international industrial water-resistant grade standard IPX5 environment for use.

The volume of the reaction device is 500 L, the temperature of the reaction chamber is controlled at 35° C., the flow rate of the mixture gas of argon and helium is 200 sccm.

In step (2), the reaction raw material is fed to a vacuum degree of 200 mTorr, and the plasma discharge is generated.

Feed reaction raw material vapor is fed through atomization and volatilization by a feeding pump, and is fed into the reaction chamber from a low pressure of 150 mTorr, and the flow rate of the fed reaction raw material is 180 μL/min.

The reaction raw material composition is:

The unsaturated fluorocarbon in the reaction raw material is:

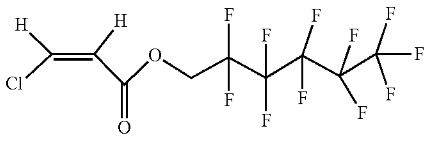 [SMILES: O=C(/C=C\Cl)OCC(F)(F)C(F)(F)C(F)(F)C(F)(F)C(F)(F)F]

In step (2), the power to turn on the plasma discharge is 300 W, and the plasma discharge mode is plasma pulse discharge.

In step (3), keep the reaction chamber vacuum degree of 160 mTorr, feed atmospheric pressure after 4 mins to one atmosphere.

It should be understood that the plasma discharge mode can be adjusted as required.

Comparable Embodiment 8 is prepared on the same other substrate under the same conditions as in Embodiment 8. The different is that the unsaturated fluorocarbons of the reaction raw material in Comparable Embodiment 8 is:

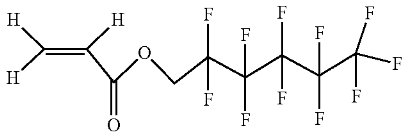 [SMILES: C=CC(=O)OCC(F)(F)C(F)(F)C(F)(F)C(F)(F)C(F)(F)F]

For aforesaid embodiments, respectively carry out the hydrophobic performance test. The test method is as follows:

The thickness of the film layer is detected by the American Filmetrics F20-UV-film thickness measuring instrument.

The water contact angle of the film layer is tested according to the GB/T 30447-2013 standard.

For the water-resistant film layer obtained in Embodiment 8, the test results are shown as follows, and the contact anger is 115~120°.

| Coating time | Nanocoating thickness | Water drop angle | Leave for 30 minutes |
|---|---|---|---|
| 12 min | 10 nm | 115° | 115 ± 1° |
| 25 min | 20 nm | 120° | 120 ± 1° |

For the water-resistant film layer obtained in Comparable Embodiment 8, the test results are shown as follows, and after leaving for 10 minutes, the water drop angle will be less than 100°.

| Coating time | Nanocoating thickness | Water drop angle | Leave for 10 minutes |
|---|---|---|---|
| 12 min | 10 nm | 103° | <100° |
| 25 min | 20 nm | 105° | <100° |

By comparing the above two tables, it can be seen that the water-resistant performance of the water-resistant film layer in Embodiment 8 is relatively stable, and it is worth noting that the carbon atom of the perfluoroalkyl group of the unsaturated fluorocarbon compound in Embodiment 8 is 5. In other words, the water-resistant film layer disclosed in the present disclosure can provide excellent water-resistant performance while reducing environmental pollution when the carbon number of the perfluoroalkyl group of the raw material is less than 8.

Further, the present disclosure provides Embodiment 9 and Comparable Embodiment 9 as follows:

Embodiment 9

The basic process steps of this embodiment are the same as that of embodiment 1, and the different process parameters are as follows:

In step (1), the vacuum degree in the reaction chamber is vacuumized to 100 mTorr, and an argon gas is fed.

The substrate is a solid material, and the solid material is an electrical component, and any interface of the water-resistant film layer formed on the surface of the substrate can be exposed to the international industrial water-resistant grade standard IPX5 environment for use.

The volume of the reaction device is 1000 L, the temperature of the reaction chamber is controlled at 50° C., the flow rate of the argon gas is 200 sccm.

In step (2), the reaction raw material is fed to a vacuum degree of 200 mTorr, and the plasma discharge is generated.

Feed reaction raw material vapor is fed through atomization and volatilization by a feeding pump, and is fed into the reaction chamber from a low pressure of 200 mTorr, and the flow rate of the fed reaction raw material is 100 μL/min.

The reaction raw material composition is:

The unsaturated fluorocarbon in the reaction raw material is:

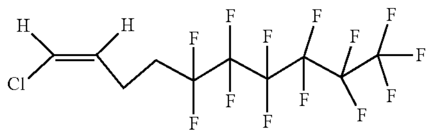 [SMILES: FC(F)(F)C(F)(F)C(F)(F)C(F)(F)C(F)(F)C(F)(F)CC/C=C\Cl]

In step (2), the power to turn on the plasma discharge is 200 W, and the plasma discharge mode is plasma pulse discharge.

In step (3), keep the reaction chamber vacuum degree of 160 mTorr, feed atmospheric pressure after 4 mins to one atmosphere.

It should be understood that the plasma discharge mode can be adjusted as required.

Comparable Embodiment 9 is prepared on the same other substrate under the same conditions as in Embodiment 9. The different is that the unsaturated fluorocarbons of the reaction raw material in Comparable Embodiment 9 is:

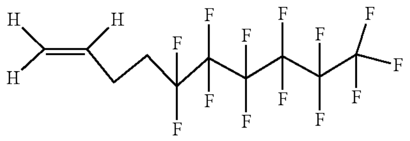 [SMILES: C=CCCC(F)(F)C(F)(F)C(F)(F)C(F)(F)C(F)(F)C(F)(F)F]

For aforesaid embodiments, respectively carry out the hydrophobic performance test. The test method is as follows:

The thickness of the film layer is detected by the American Filmetrics F20-UV-film thickness measuring instrument.

The water contact angle of the film layer is tested according to the GB/T 30447-2013 standard.

For the water-resistant film layer obtained in Embodiment 9, the test results are shown as follows, and the contact anger is 117~121°.

| Coating time | Nanocoating thickness | Water drop angle | Leave for 30 minutes |
|---|---|---|---|
| 23 min | 10 nm | 117° | 117 ± 1° |
| 45 min | 20 nm | 121° | 121 ± 1° |

For the water-resistant film layer obtained in Comparable Embodiment 9, the test results are shown as follows, and after leaving for 10 minutes, the water drop angle will be less than 100°.

| Coating time | Nanocoating thickness | Water drop angle | Leave for 10 minutes |
|---|---|---|---|
| 23 min | 10 nm | 105° | <100° |
| 45 min | 20 nm | 107° | <100° |

By comparing the above two tables, it can be seen that the water-resistant performance of the water-resistant film layer in Embodiment 9 is relatively stable, and it is worth noting that the carbon atom of the perfluoroalkyl group of the unsaturated fluorocarbon compound in Embodiment 9 is 6. In other words, the water-resistant film layer disclosed in the present disclosure can provide excellent water-resistant performance while reducing environmental pollution when the carbon number of the perfluoroalkyl group of the raw material is less than 8.

Further, the present disclosure provides Embodiment 10 and Comparable Embodiment 10 as follows:

Embodiment 10

The basic process steps of this embodiment are the same as that of embodiment 1, and the different process parameters are as follows:

In step (1), the vacuum degree in the reaction chamber is vacuumized to 150 mTorr, and a nitrogen gas is fed.

The substrate is a solid material, and the solid material is an electrical component, and any interface of the water-resistant film layer formed on the surface of the substrate can be exposed to the international industrial water-resistant grade standard IPX6 environment for use.

The volume of the reaction device is 560 L, the temperature of the reaction chamber is controlled at 50° C., the flow rate of the nitrogen gas is 220 sccm.

In step (2), the reaction raw material is fed to a vacuum degree of 220 mTorr, and the plasma discharge is generated.

Feed reaction raw material vapor is fed through atomization and volatilization by a feeding pump, and is fed into the reaction chamber from a low pressure of 150 mTorr, and the flow rate of the fed reaction raw material is 320 μL/min.

The reaction raw material composition is:

The unsaturated fluorocarbon in the reaction raw material is:

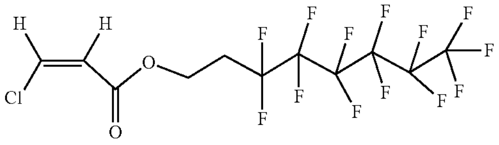 [SMILES: O=C(/C=C\Cl)OCCC(F)(F)C(F)(F)C(F)(F)C(F)(F)C(F)(F)C(F)(F)F]

In step (2), the power to turn on the plasma discharge is 240 W, and the plasma discharge mode is plasma pulse discharge.

In step (3), keep the reaction chamber vacuum degree of 160 mTorr, feed atmospheric pressure after 4 mins to one atmosphere.

It should be understood that the plasma discharge mode can be adjusted as required.

Comparable Embodiment 10 is prepared on the same other substrate under the same conditions as in Embodiment 10. The different is that the unsaturated fluorocarbons of the reaction raw material in Comparable Embodiment 10 is:

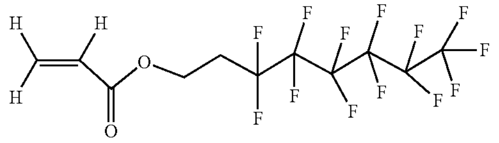 [SMILES: C=CC(=O)OCCC(F)(F)C(F)(F)C(F)(F)C(F)(F)C(F)(F)C(F)(F)F]

For aforesaid embodiments, respectively carry out the hydrophobic performance test. The test method is as follows:

The thickness of the film layer is detected by the American Filmetrics F20-UV-film thickness measuring instrument.

The water contact angle of the film layer is tested according to the GB/T 30447-2013 standard.

For the water-resistant film layer obtained in Embodiment 10, the test results are shown as follows, and the contact angle is 115~122°.

| Coating time | Nanocoating thickness | Water drop angle | Leave for 30 minutes |
|---|---|---|---|
| 7 min | 10 nm | 115° | 115 ± 1° |
| 14 min | 20 nm | 122° | 122 ± 1° |

For the water-resistant film layer obtained in Comparable Embodiment 10, the test results are shown as follows, and after leaving for 10 minutes, the water drop angle will be less than 100°.

| Coating time | Nanocoating thickness | Water drop angle | Leave for 10 minutes |
|---|---|---|---|
| 7 min | 10 nm | 110° | <100° |
| 14 min | 20 nm | 112° | <100° |

By comparing the above two tables, it can be seen that the water-resistant performance of the water-resistant film layer in Embodiment 10 is relatively stable, and it is worth noting that the carbon atom of the perfluoroalkyl group of the unsaturated fluorocarbon compound in Embodiment 10 is 6. In other words, the water-resistant film layer disclosed in the present disclosure can provide excellent water-resistant performance while reducing environmental pollution when the carbon number of the perfluoroalkyl group of the raw material is less than 8.

The persons skilled in the field should understand that the embodiments of the present disclosure shown in the above description are only examples and do not limit the present disclosure. The purpose of the present disclosure is fully and effectively realized. The functional and structural principles of the present disclosure have been demonstrated and illustrated in embodiment, while the implementation of the embodiment may be subject to any distortion or modification without deviation from the principles described.

What is claimed is:

1. A water-resistant film layer, wherein it forms with a compound represented by the general formula (I) on the surface of a substrate by a plasma chemical vapor deposition method, (I)

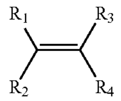

wherein one of $R_1$, $R_2$, and $R_3$ is halogen, and two of $R_1$, $R_2$, and $R_3$ are hydrogen, and $R_4$ is selected from the group consisting of $-C(O)O(CH_2)_nC_mF_{2m+1}$, and $-(CH_2)_xC_mF_{2m+1}$, wherein n and x are respectively an integer ranging from 1 to 8, and m is an integer ranging from 1 to 12.

2. The water-resistant film layer according to claim 1, wherein the group $-C_mF_{2m+1}$ is a straight-chain perfluoroalkyl group.

3. The water-resistant film layer according to claim 1, wherein $R_1$ and/or $R_2$ is hydrogen.

4. The water-resistant membrane layer according to claim 1, wherein the $R_4$ is group $-C(O)O(CH_2)_nC_mF_{2m+1}$, wherein the group $-C_mF_{2m+1}$ is a straight-chain perfluoroalkyl group and wherein m is no more than 6.

5. The water-resistant film layer according to claim 1, wherein $R_3$ is chlorine.

6. An article with a water-resistant film layer, wherein the article is set with the water-resistant film layer, and wherein the water-resistant film layer forms with a compound represented by the general formula (I) on the surface of a substrate by a plasma chemical vapor deposition method, (I)

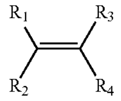

wherein one of $R_1$, $R_2$, and $R_3$ is halogen, and two of $R_1$, $R_2$, and $R_3$ are hydrogen, and $R_4$ is selected from the group consisting of $-C(O)O(CH_2)_nC_mF_{2m+1}$, and $-(CH_2)_xC_mF_{2m+1}$, wherein n and x are respectively an integer ranging from 1 to 8, and m is an integer ranging from 1 to 12.

7. The article according to claim 6, wherein the group $-C_mF_{2m+1}$ is a straight-chain perfluoroalkyl group.

8. The article according to claim 6, wherein $R_1$ and/or $R_2$ is hydrogen.

9. The article according to claim 6, wherein the article is selected from one or more of the group consisting of electronic products, silk fabric, metal products, glass products and ceramic products.

10. A water-resistant film layer, wherein it forms with a compound represented by the general formula (I) on the surface of a substrate by a plasma chemical vapor deposition method, (I)

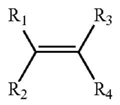

wherein one of $R_1$, $R_2$, and $R_3$ is halogen, and two of $R_1$, $R_2$, and $R_3$ are hydrogen, wherein $R_4$ is a group $X-R_5$, and $R_5$ is $C_mF_{2m+1}$ with m being integer of 1 to 8, and X is a group $-C(O)O(CH_2)_nY-$, wherein n is an integer ranging from 0 to 10, and Y is a bond or X is a group $-(CH_2)_xU-$, wherein x is an integer ranging from 1 to 10, and U is a bond.

11. The water-resistant film layer according to claim 10, wherein the general formula (I) is embodied as a compound of general formula (II), (II)

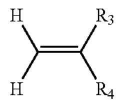

wherein $R_3$ is halogen, $R_4$ is $-C(O)O(CH_2)_nR_5$.

12. An article with a water-resistant film layer, wherein the article is set with the water-resistant film layer, and wherein the water-resistant film layer forms with a compound represented by the general formula (I) on the surface of a substrate by a plasma chemical vapor deposition method, (I)

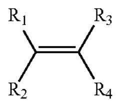

wherein one of $R_1$, $R_2$, and $R_3$ is halogen, and two of $R_1$, $R_2$, and $R_3$ are hydrogen, wherein $R_4$ is a group $X-R_5$, and $R_5$ is $C_mF_{2m+1}$ with m being integer of 1 to 8, and X is a group $-C(O)O(CH_2)_nY-$, wherein n is an integer ranging from 0 to 10, and Y is a bond or X is a group $-(CH_2)_xU-$, wherein x is an integer ranging from 1 to 10, and U is a bond.

13. The article according to claim 12, wherein the article is selected from one or more of the group consisting of electronic products, silk fabrics, metal products, glass products and ceramic products.

14. The article according to claim 12, wherein the water-resistant membrane layer set in the article is prepared by a compound of general formula (II),

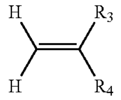

(II)

wherein $R_3$ is halogen, $R_4$ is —$C(O)O(CH_2)_nR_5$.

* * * * *